(12) United States Patent
Mixon

(10) Patent No.: US 9,715,241 B2
(45) Date of Patent: Jul. 25, 2017

(54) TEMPERATURE MONITORING AND CONTROL APPARATUS AND METHOD

(71) Applicant: Knappco Corporation, Riverside, MO (US)

(72) Inventor: Claude W. Mixon, Billings, MO (US)

(73) Assignee: Knappco Corporation, Riverside, MO (US)

( * ) Notice: Subject to any disclaimer, the term of this patent is extended or adjusted under 35 U.S.C. 154(b) by 644 days.

(21) Appl. No.: 14/204,872

(22) Filed: Mar. 11, 2014

(65) Prior Publication Data

US 2014/0277820 A1 Sep. 18, 2014

Related U.S. Application Data

(60) Provisional application No. 61/785,332, filed on Mar. 14, 2013.

(51) Int. Cl.
*G05D 23/19* (2006.01)
*B60H 1/00* (2006.01)
*G05D 23/00* (2006.01)

(52) U.S. Cl.
CPC ..... *G05D 23/1919* (2013.01); *B60H 1/00642* (2013.01); *B60H 1/00735* (2013.01); *B60H 1/00885* (2013.01); *B60H 1/00899* (2013.01); *G05D 23/00* (2013.01); *G05D 23/19* (2013.01); *G05D 23/1927* (2013.01)

(58) Field of Classification Search
None
See application file for complete search history.

(56) References Cited

U.S. PATENT DOCUMENTS 2,973,186 A * 2/1961 Hazard ............ B61D 27/0081
165/104.14
8,461,958 B2 * 6/2013 Saenz .................. H04W 4/046
340/3.1

FOREIGN PATENT DOCUMENTS

GB 811336 4/1959

* cited by examiner

*Primary Examiner* — Qing Wu
(74) *Attorney, Agent, or Firm* — Spencer Fane LLP

(57) ABSTRACT

A wireless system for monitoring and control of the temperature of a product in transport includes a controller system wirelessly connected to a temperature system and a valve control system. The temperature system measures the current temperature of the product and wirelessly transmits the temperature information to the controller system. The valve control system controls the position of a valve allowing heated fluid to move through the product, heating the product. The controller system allows an operator to input a high temperature limit and low temperature limit and alarm, and using the current temperature of the product, wirelessly signals the valve control system to open or close the valve in order to keep the temperature of the product between the high temperature limit and low temperature limit. The controller system monitors and records the product temperature, high and low temperature limits and alarms, and provides a report of the data.

11 Claims, 10 Drawing Sheets

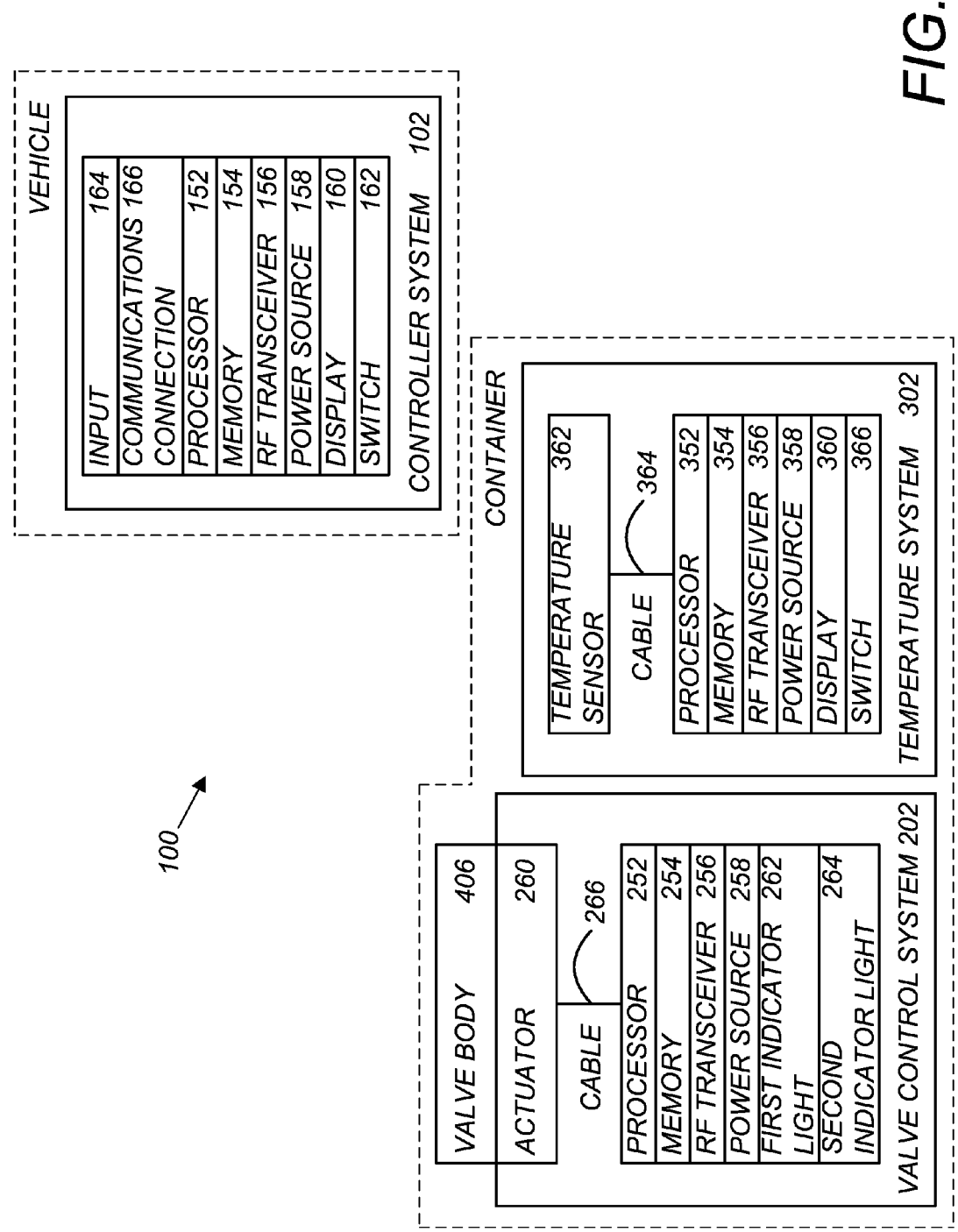

TEMPERATURE MONITORING AND CONTROL APPARATUS AND METHOD

RELATED APPLICATION

The present U.S. non-provisional patent application is related to and claims priority benefit of an earlier-filed provisional patent application titled TEMPERATURE MONITORING & CONTROL APPARATUS & METHOD, Ser. No. 61/785,332, filed Mar. 14, 2013. The identified earlier-filed application is hereby incorporated by reference into the present application as though fully set forth herein.

BACKGROUND OF THE INVENTION

The present disclosed subject matter relates generally to temperature monitoring and control, and more particularly to wireless sensing of the temperature of a product and automatic monitoring and control of the temperature of the product.

Liquids used in manufacturing processes and food preparation are often created at a first facility and transported in a container to a second facility for use. Some liquids require heating during transport to prevent the liquid from cooling to a point where the liquid attains undesirable physical properties, including attaining an undesirable reaction temperature, becoming too viscous to transfer from the container, or solidification within the container. Heat may be introduced to the liquid contents of a container by a heat source during transportation to avoid undesirable cooling of the liquid. For example, the heat generated by a vehicle moving a tank container can be diverted to the container, such as the heat generated by the engine of a tractor pulling a tank trailer. The tank container can be heated by an independent heat source, such as heat generated by an attached heat generator, or heat generated by the origin or destination facility when the tank container is not connected to a prime mover or attached heat generator.

SUMMARY

The disclosed subject matter includes an apparatus for monitoring and controlling the temperature of the contents of a container during transportation. Additionally, the disclosed subject matter includes a method for monitoring and controlling the temperature of the contents of a container during transportation. A temperature system monitors the temperature of the contents within the container and wirelessly communicates with a controller system and a valve control system. The controller system wirelessly communicates with the temperature system and valve control system, and allows an operator to send commands to the valve control system for controlling the addition of heat to the contents of the container. For example, the temperature monitor and control apparatus and method may be used when heating a liquid within a tank being moved by a vehicle, such as a tractor.

An operator inputs commands into the controller system to set the temperature range at which the liquid is to be maintained. On a periodic basis, the temperature system senses the temperature of the liquid and transmits the temperature data to the controller system. The controller system compares the received current temperature value and compares the data to the stored high and low temperature values. If the current temperature value is below the low temperature limit, the valve control system opens a valve at the exterior of the tank and allows a fluid heated by the engine of the tractor to flow into a conduit that passes through the liquid within the tank. If the current temperature value is above the high temperature limit, the valve control system closes the valve and prevents heated fluid from flowing through the conduit within the tank.

The controller system stores temperature data received from the temperature system, input commands by the operator, and valve control system data, and provides an output in the form of a data log providing an audit trail of the temperature of the contents of the container during transit.

BRIEF DESCRIPTION OF THE DRAWINGS

The drawings constitute a part of this specification and include exemplary embodiments of the disclosed subject matter and illustrate various objects and features thereof.

FIG. 5 is a perspective view of the controller system.

FIG. 6 is a perspective view of the temperature system.

FIG. 7 is a block diagram of an embodiment of an exemplary hardware configuration model for a device implementing the temperature monitoring and control system and method.

DETAILED DESCRIPTION

Figure 1:
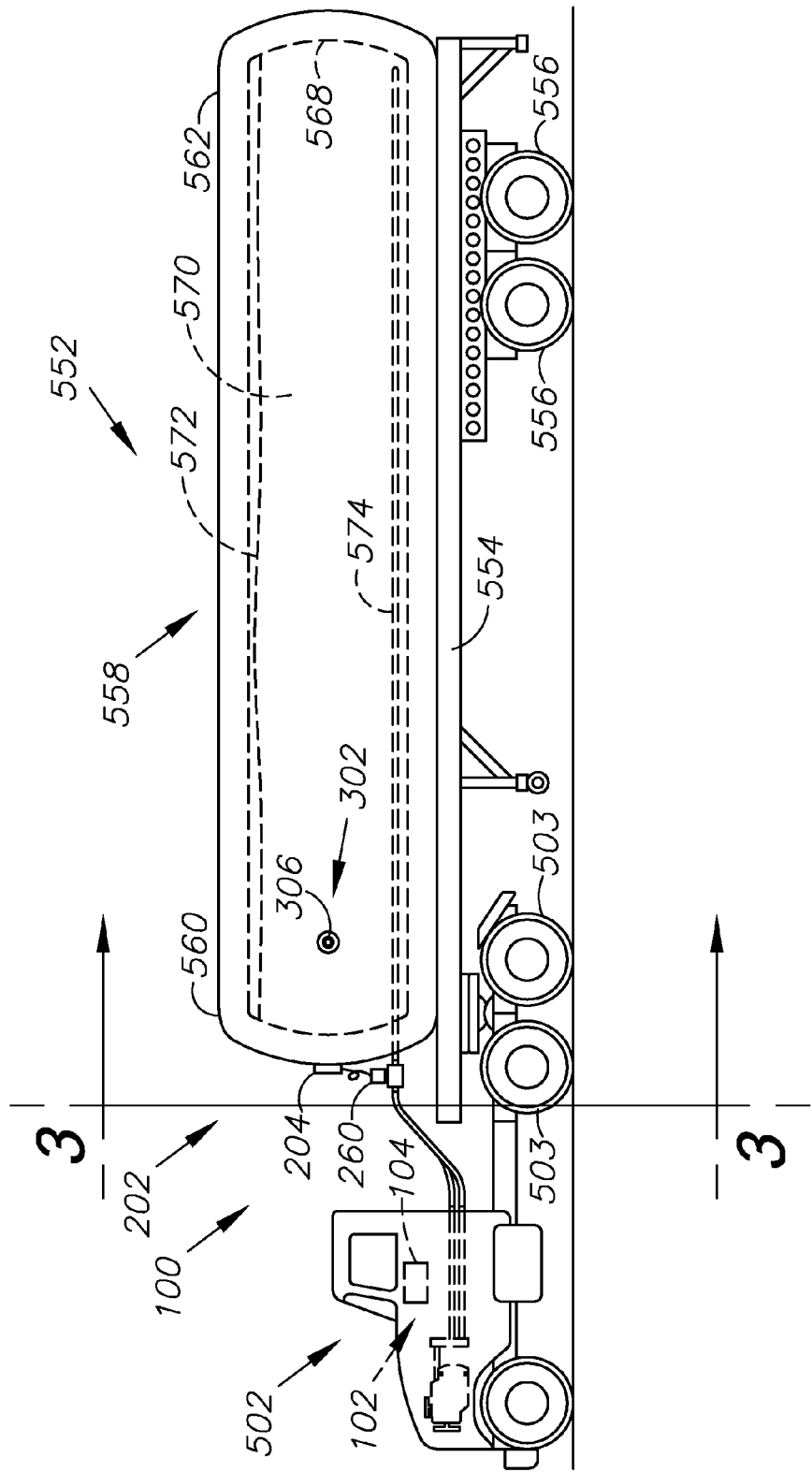
FIGS. 1-2 are elevation views of a temperature monitoring and control system in use with a tank on a trailer connected to a tractor.

An embodiment of a temperature monitoring and control system and method 100 generally includes a controller system 102 wirelessly connected to a valve control system 202 and a temperature system 302 for monitoring and control of the temperature of the contents of a container. In an embodiment, the system and method 100 is used to control the temperature of a liquid 572 in a container. Monitoring and control of the temperature of the liquid within the container can prevent the liquid from attaining undesirable physical properties, including degradation, chemical reactions, and solidification. An exemplary environment employing the temperature monitoring and control system 100 will be described, followed by a description of the temperature monitoring and control system and method 100. FIGS. 1-6 show an embodiment of the temperature monitoring and control system and method 100 in use with a vehicle, such as a tractor 502, and a container, such as a tank 558, on a trailer 552. The tank 558 may comprise any wide range of suitable containers, such as open containers and sealable containers.

Figure 2:
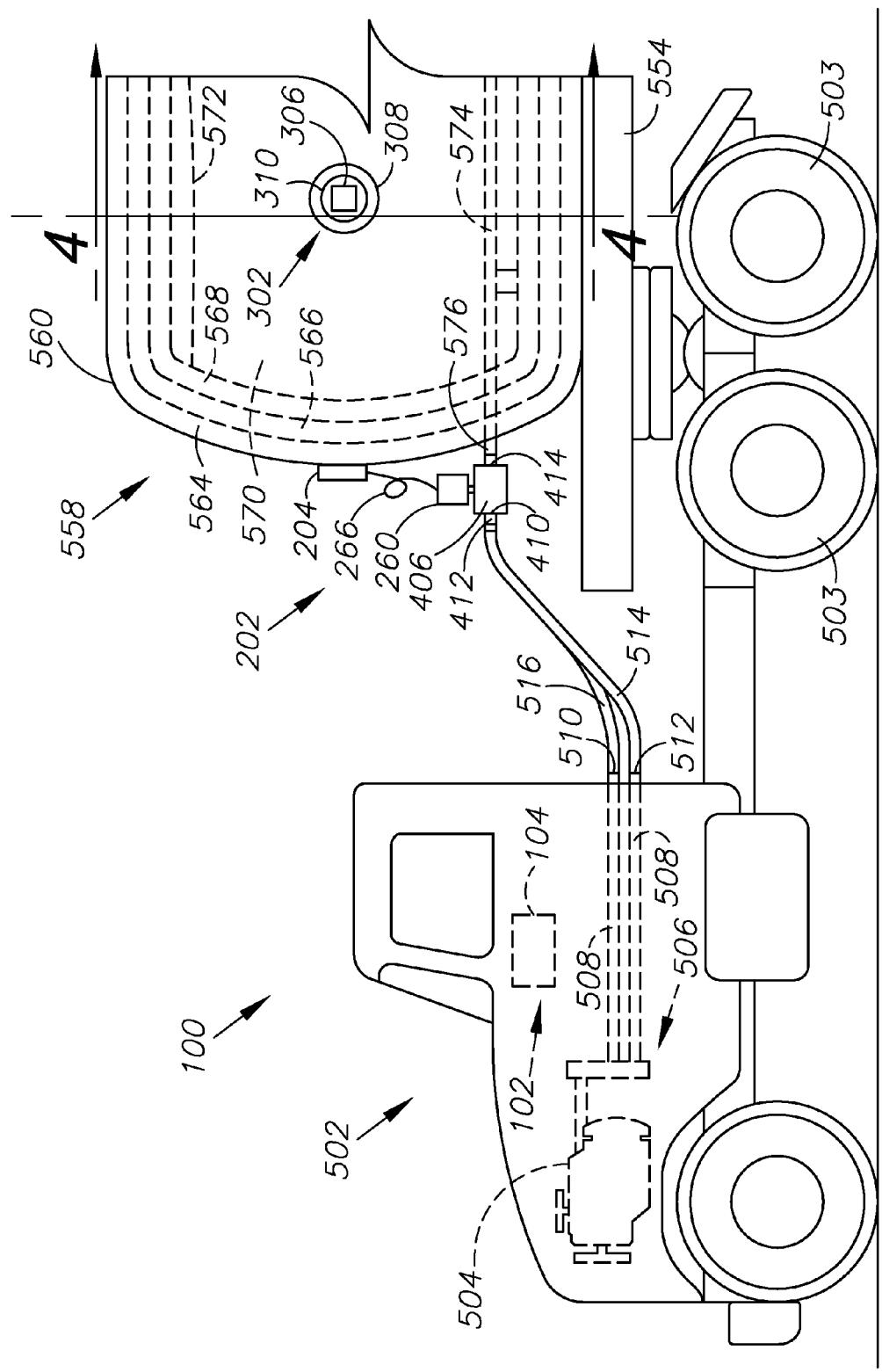
Figure 3:
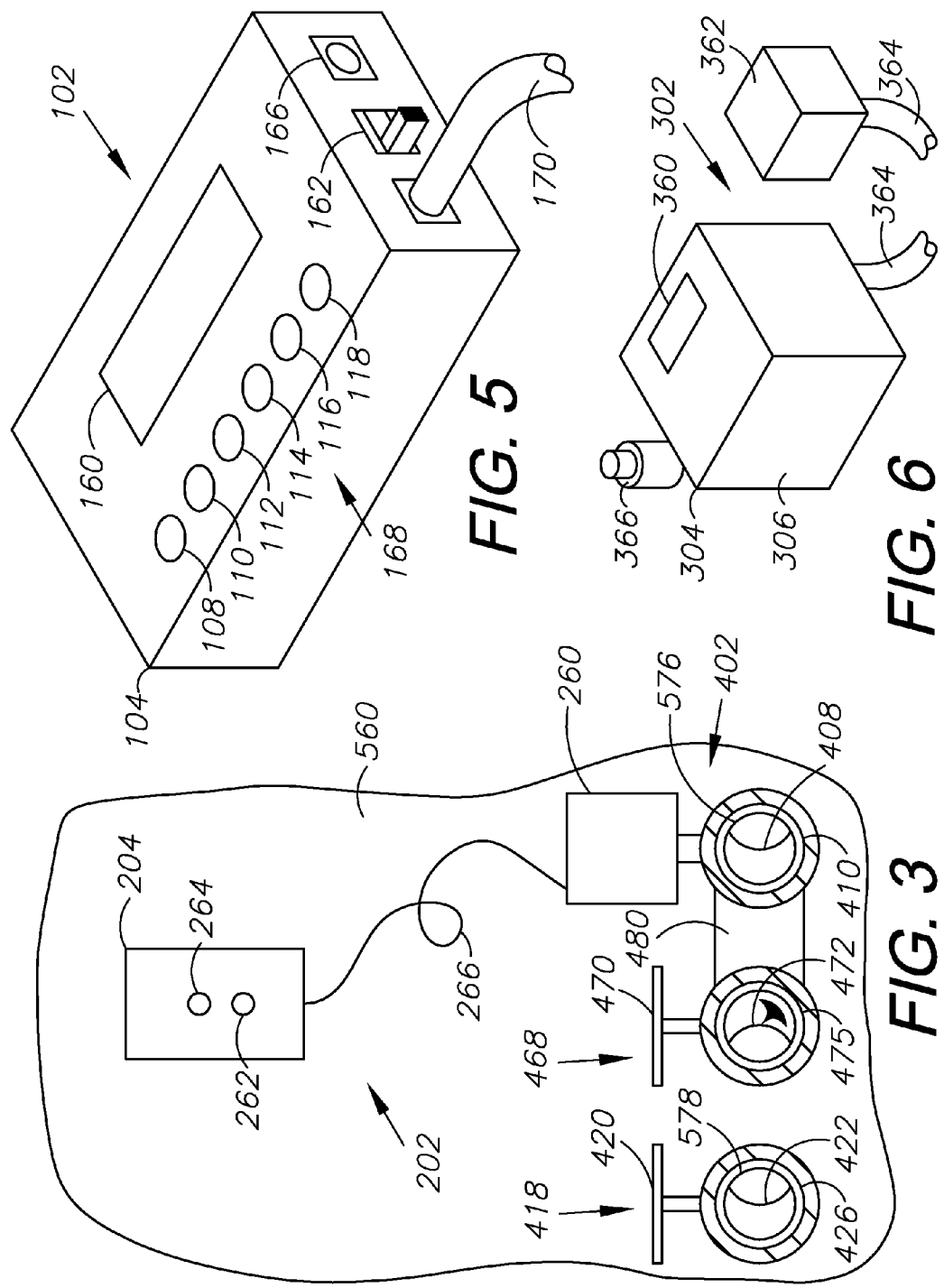
FIG. 3 is an elevation view of the valve control system mounted to the front of the tank.
Figure 4:
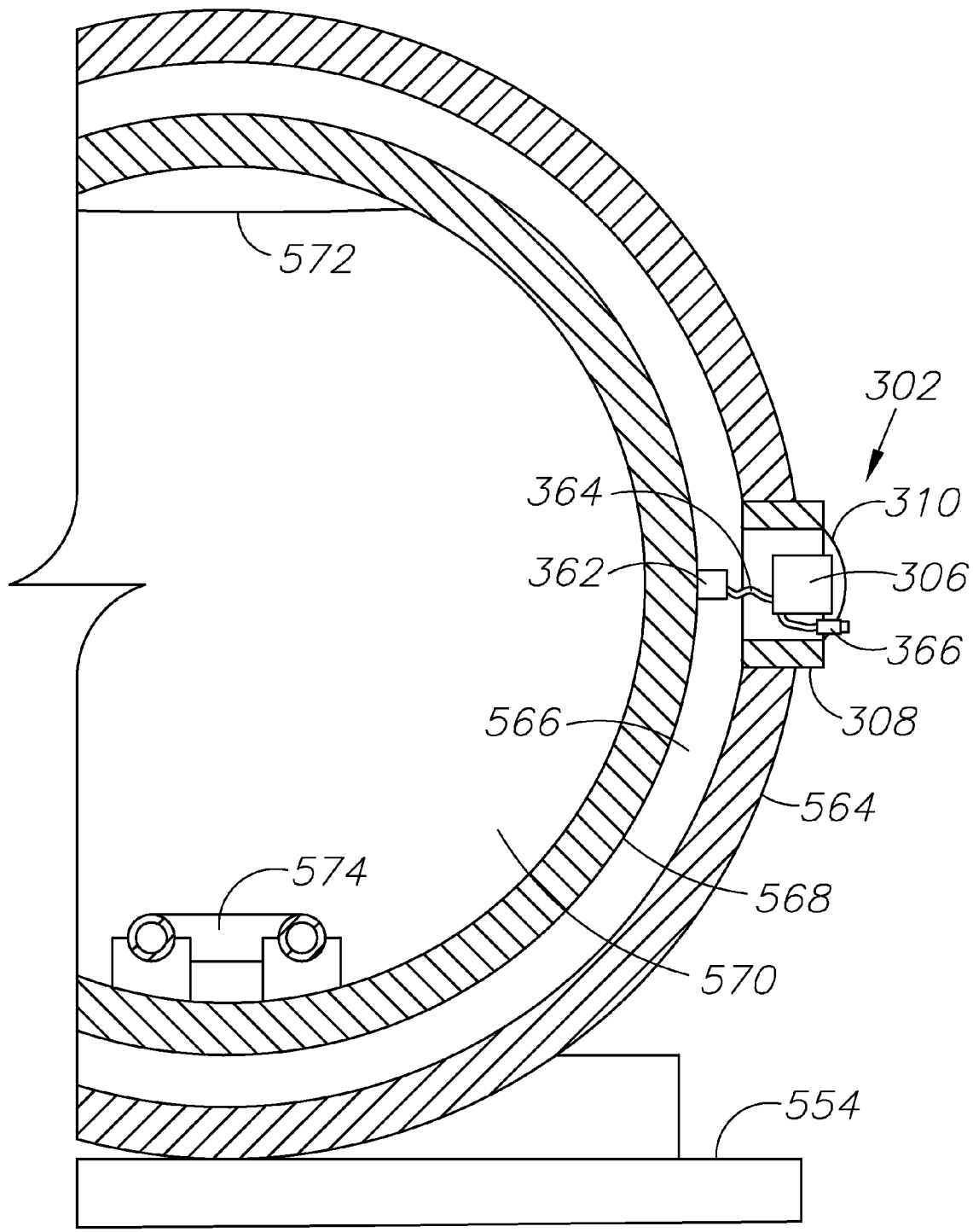
FIG. 4 is a section view of the temperature system taken generally along lime 3-3 in FIG. 1.

Referring to FIGS. 1-2, the tractor 502 includes an internal combustion engine 504 for driving driven wheels 503 and that generates heat, operating as a heat source. A heat transfer system 506, such as a cooling system for the internal combustion engine 504, removes heat from the internal combustion engine 504 and transfers the heat to the tank 558. In the exemplary embodiment, the heat transfer system 506 uses a heat retaining fluid, such as engine coolant, to remove heat from the internal combustion engine 504. The heat retaining fluid exits the heat transfer system 506 by a conduit 508 with an outlet 512. A supply conduit 514 transfers the heat retaining fluid from the outlet 512 to an inlet 576 at the tank 558. The tractor 502 has an electrical system powering electrical components of the vehicle, and for powering the electrical components of the valve control system 202.

The tank 558 extends from a first end 560 at the front to a second end 562 at the back, and is mounted to a frame 554 on the trailer 552. The trailer 552 includes an electrical system connected to the electrical system of the tractor 502 powering the electrical components of the trailer 552, including marking lights. Wheels 556 attached to the back of the frame 554 allow the tractor 502 to connect to the front of the frame 554 for transporting the tank 558 from location to location. In an embodiment, the tank 558 includes an inner wall 568 forming an inner chamber 570, and an adjacent outer wall 564, with insulation 566 in between for aiding in heat retention of the tank 558 contents. In an embodiment, the inner chamber 570 includes a conduit 574 extending from an inlet 576 at the exterior of the first end 560 and an outlet 578 at the exterior of the first end 560. In an embodiment, the conduit 574 is a pipe within which the heat retaining fluid flows. In an embodiment, the conduit 574 is planar unit comprising a top plate and an opposite bottom plate forming a cavity in between by which the heat retaining fluid enters through an inlet and exits through an outlet, thereby providing a large surface area in contact with the contents of the tank 558 and dispersing the heat over a wide area. The conduit 574 may form one or more loops extending rearward within the inner chamber 570 from the inlet 572 toward the second end 562 returning back to the first end 560, terminating at the outlet 578. In another embodiment, the conduit 574 may form one or more loops extending upward and downward within the inner chamber 570. In an embodiment, the conduit 574 is in contact with the contents of the inner chamber 570, and the heat transfers from the heat retaining fluid within the conduit 574 into the contents. In an alternative embodiment, the conduit 574 is disposed between the inner wall 568 and the outer wall 564, and the heat transfers from the heat retaining fluid within the conduit 574 through the exterior of the inner chamber 570 and to the contents of the inner chamber 570. A return conduit 516 transfers the heat retaining fluid from the outlet 578 to the inlet 510 of the heat transfer system 506 to be reheated and circulated back through the conduit 574 as needed.

In use, heat retaining fluid having heat exits the heat transfer system 506 via the outlet 512 where it is carried to the conduit 574 by the supply conduit 514. A valve assembly 402 disposed between the heat transfer system 506 and the conduit 574 includes a valve 408 that opens and closes to permit or prohibit movement of heated heat retaining fluid into the conduit 574. In an embodiment, the valve assembly 402 is disposed between the inlet 576 and conduit 574. In an embodiment, the valve 408 is a ball valve. In an embodiment, the valve 408 is a butterfly valve.

An outlet valve assembly 418 includes a valve body 420 disposed between the heat transfer system 506 and the conduit 574. The valve assembly 418 includes a valve 422, such as a ball valve, that controls movement of heat retaining fluid from the conduit 574 to the heat transfer system 506. In an embodiment, the valve 422 is disposed between the outlet 578 and conduit 516.

The inlet valve assembly 402 includes an actuator 260 operably connected to the valve 408 for opening and closing the valve 408. The actuator 260 is operably connected to the valve control system 202 for controlling movement of the valve 408. The valve body 406 extends between an inlet 410 connected to a fitting 412 and an outlet 414 connected to the inlet 576, with the fitting 412 providing a connection for the conduit 514. Movement of the heat retaining fluid from the heat transfer system 506 to the conduit 574 is controlled via the valve control system 202, and control of the valve control system 202 is via the controller system 102.

A bypass valve assembly 468 includes a valve body 470 connected to the conduit between the valve assembly 402 and the conduit 574 by a bypass 480. The bypass valve assembly 468 allows an operator to bypass the valve assembly 402 and heat the contents of the tank 558 if there is a problem with the system 100.

The controller system 102 interfaces with one or more temperature systems 302 located about the tank 558 for measuring the temperature of the contents of the inner chamber 570. The temperature system 302 includes a temperature sensor 362 connected to a controller system 304 by a cable 364. In an embodiment, the temperature sensor 362 includes a metallic pad that is in contact with the inner wall 568. The temperature sensor 362 is attached to the inner wall 568 by an adhesive, including thermal tape or epoxy. In an alternative embodiment, the temperature sensor 362 includes a probe that passes through the inner wall 568 and comes in contact with the contents of the inner chamber 570 for detecting the temperature of the contents. In an embodiment, the temperature sensor 362 is a thermocouple, including a type J thermocouple. The controller system 304 includes a housing 306 with a display 360. The housing 306 may be mounted within a housing 308 at the outer wall 564 having a window 310 allowing the display 360 to be viewed from the exterior of the tank 558.

FIG. 7 is a block diagram showing the components of the temperature monitoring and control system and method 100. The temperature system 302 communicates with the controller system 102 and measures the temperature of the contents of the tank 558, and communicates the information to the controller system 102. The temperature system 304 includes, a switch 366, a radio frequency (RF) transceiver 356, one or more computer-readable media, including a memory 354, the display 360, and a power source 258 connected to one or more computational element(s), including a processor 352 within the housing 306. The power source 258 is electrical and comprises electrochemical cells, including nickel cadmium, nickel metal hydride, lithium ion, lithium ion polymer, lithium sulfur dioxide, an ultrahigh capacity capacitor, or a fuel cell. In an alternative embodiment, the switch 366 is connected to the processor 352 by a cable. Upon the initial connection of power between the processor 352 and the power source 258, the display 360 will illuminate indicating the temperature system 304 is powered and operable. The temperature sensor 362 is connected to the processor 352 by the cable 364. The RF transceiver 356 allows the temperature system 304 to wirelessly transmit and receive data and radio signals between other RF devices, including transceivers.

The valve control system 202 communicates with the controller system 102 and controls operation of a valve assembly 402 to add heat to the contents of the tank 558. FIG. 7 is a block diagram of an exemplary hardware configuration model for an embodiment of the valve control system 202. The control system 202 includes an RF transceiver 256, one or more computer readable media, including a memory 254, and first and second indicator lights 262, 264 connected to one or more computational element(s), including a processor 252 within a housing 204. The housing 204 is connected to the trailer 552 and provides openings for the first and second indicator lights 262, 264. An external power source 258, such as the electrical system of the trailer 552, is connected to the processor 252 via a cable. Alternatively, the power source 258 may be an electrochemical cell. The actuator 260 receives power from, and is controlled by, the valve control system 202 via a connection, including a cable 266. The actuator 260 is mechanically connected to the valve 408 for controlling the position of the valve 408 within the valve body 406. The RF transceiver 256 allows the valve control system 202 to wirelessly transmit and receive data and radio signals between other RF devices, including transceivers.

The controller system 102 allows an operator to assess the current temperature of the contents of the tank 558, and determine when heat is added to the contents of the tank 558. The controller system 102 includes an RF transceiver 156, one or more computer-readable media, including a memory 154, a display 160, input devices 168, an input connection 164, a speaker, and a communications connection 166 connected to one or more computational element(s), including a processor 152 within a housing 104. Input devices 168 include switches 108, 110, 112, 114, 116, 118. In an embodiment, the input device is a computer device including a mobile computing device having a wired or wireless connection with the controller system 102. In an embodiment, the controller system 102 is a computer that interfaces with the valve control system 202 and the temperature system 302. The housing 104 may be located in the cabin of the tractor 502. The power source 158 is electrical, and includes electrical power from the electrical system of the tractor 502 via a cable 170 when the controller system 102 is installed in a vehicle. In an alternative embodiment, the controller system 102 may be a mobile device whereby the power source 158 is the electricity from a wall outlet or an electrochemical cell. The RF transceiver 156 allows the controller system 102 to wirelessly transmit and receive data and radio signals between other RF devices, including transceivers.

In an alternative embodiment, the heat source is separate from the vehicle. In an embodiment, the heat source is mounted to the trailer 552, and heat retaining fluid flows into the conduit 574 through the valve assembly 406, and returns to the heat source via the outlet 578. In an alternative embodiment, the heat source is a stand-alone heat source, and the heat retaining fluid is steam or boiling water from a boiler at a location where the trailer 552 is parked, such as a manufacturing facility. Accordingly, the controller system 102 may be a mobile device allowing the monitoring and control of the temperature of the contents to be performed by an operator at the facility until the trailer 552 connected to a vehicle with a controller system 102 and transported.

In an embodiment, each temperature system 302 and each valve control system 202 of the system 100 wirelessly link with a controller system 102 to prevent the controller system 102 from connecting to any temperature systems 302 and valve control systems 202 not within the particular system 100. For example, a system 100 may be used for one container and the system 100 may operate in close proximity to a second system 100. Therefore, it would be undesirable to have the components of the systems interfering with each other.

Figure 8:
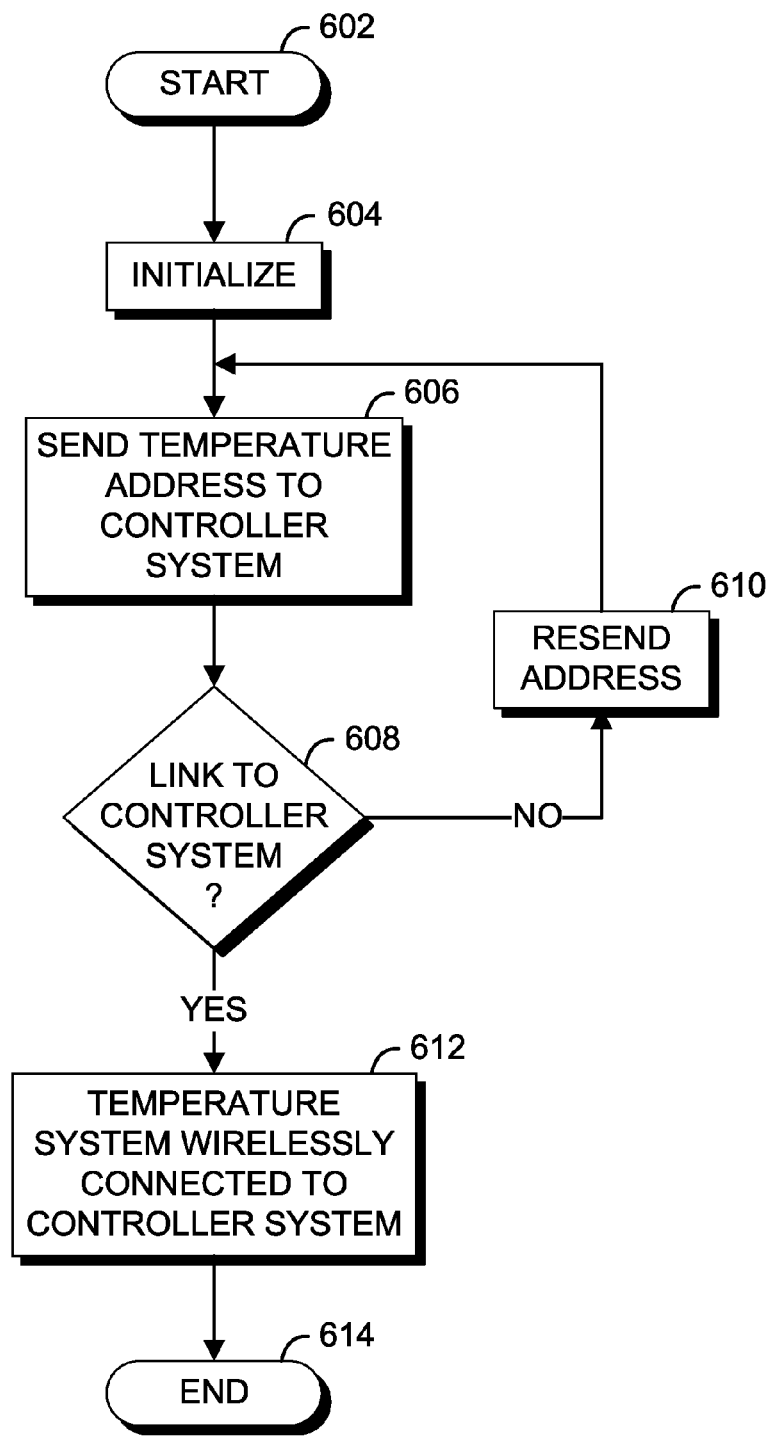
FIG. 8 is a flowchart of another aspect of the temperature monitoring and control method.

FIG. 8 shows a method of wirelessly linking a temperature system 302 to a controller system 102. From a start 602 the temperature system 302 is powered and initialized at 604, including transmitting a signal including a temperature system address data stored in memory 354 wirelessly over a radio frequency to the controller system 102 at 606. The sending temperature system address data includes a unique device address including the device type and serial number. The radio frequency is received by the controller system 102 and the temperature system address is stored in memory 354, or, alternatively from decision box 608, the temperature system address is retransmitted to the controller system 102 at 610. During retransmission, if linking of the temperature system 302 with the controller system 102 is not completed within a period of time, for example, within about two minutes, the linking operation will end and the temperature system 302 will revert to the previous memorized address. When the temperature system address is received by the controller system 102, the temperature system 302 is wirelessly linked by a radio frequency to the controller system 102 at 612, with the linking operation ending at 614. In use, an operator will initialize the linking process beginning with the temperature system 302, as described above, and within about two minutes, the controller system 102 will be powered and initialized as described below forming a link between the two devices.

Figure 10:
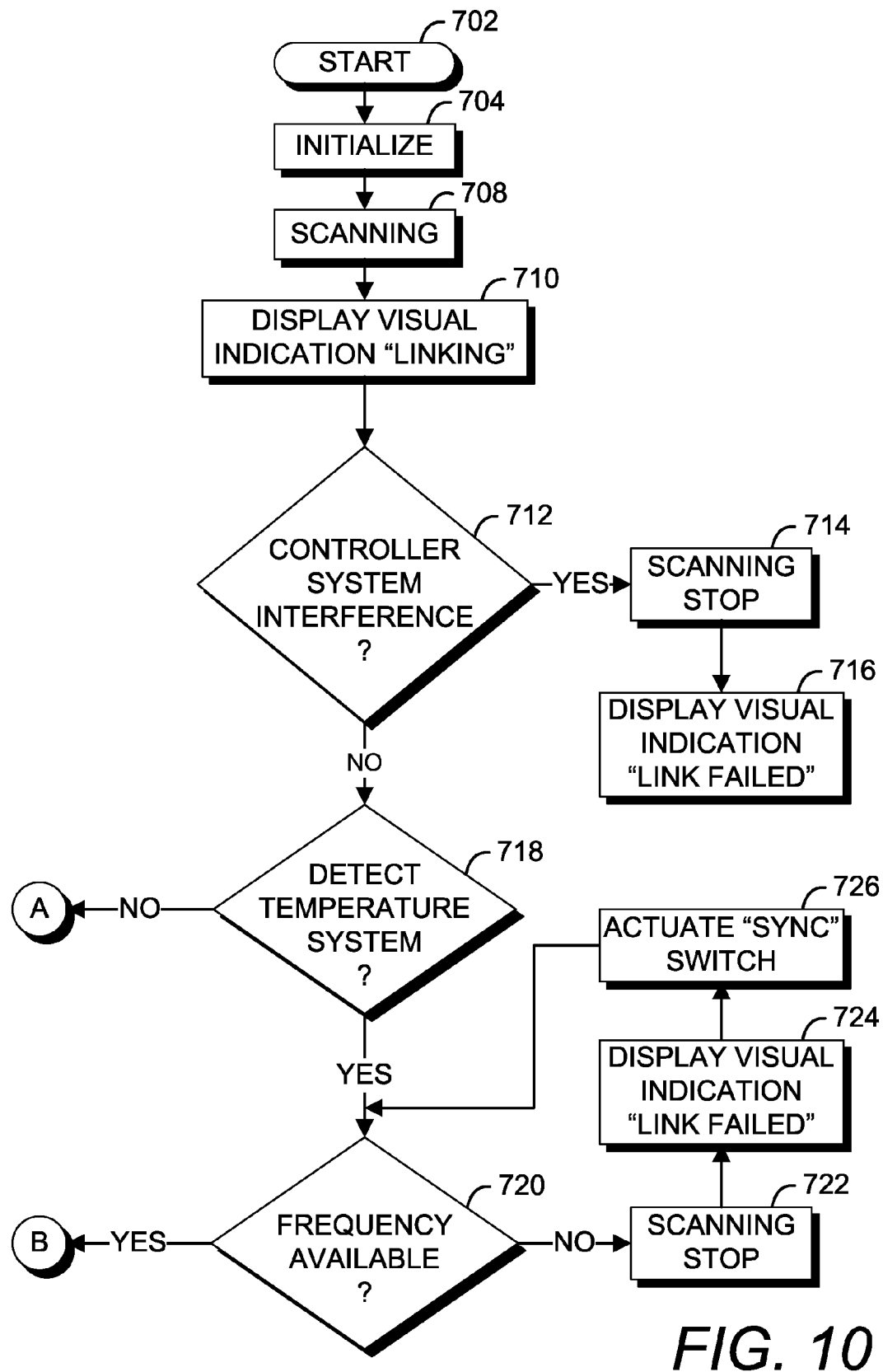
FIG. 10 is a flowchart of another aspect of the temperature monitoring and control method.
Figure 11:
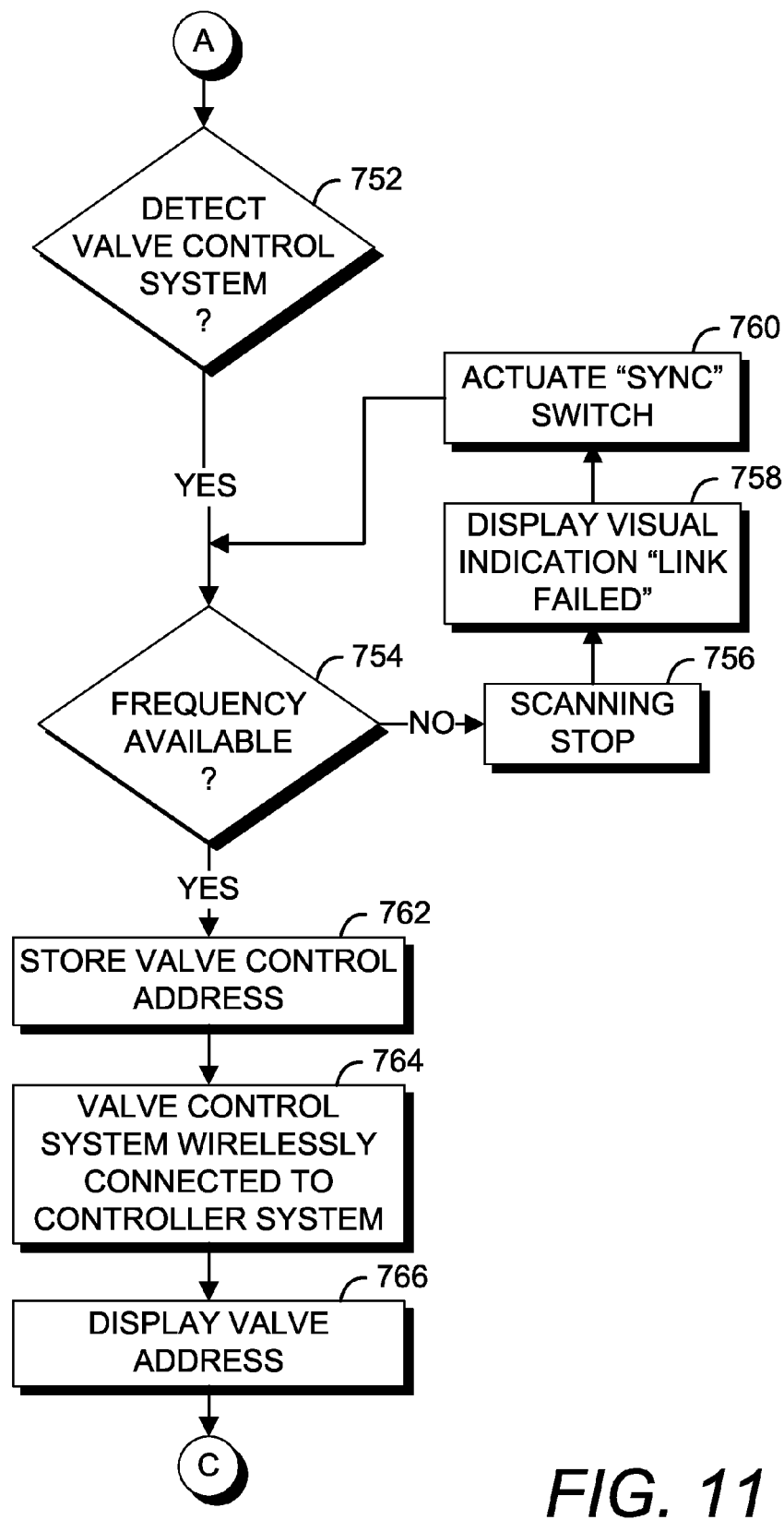
FIG. 11 is a flowchart of another aspect of the temperature monitoring and control method.
Figure 12:
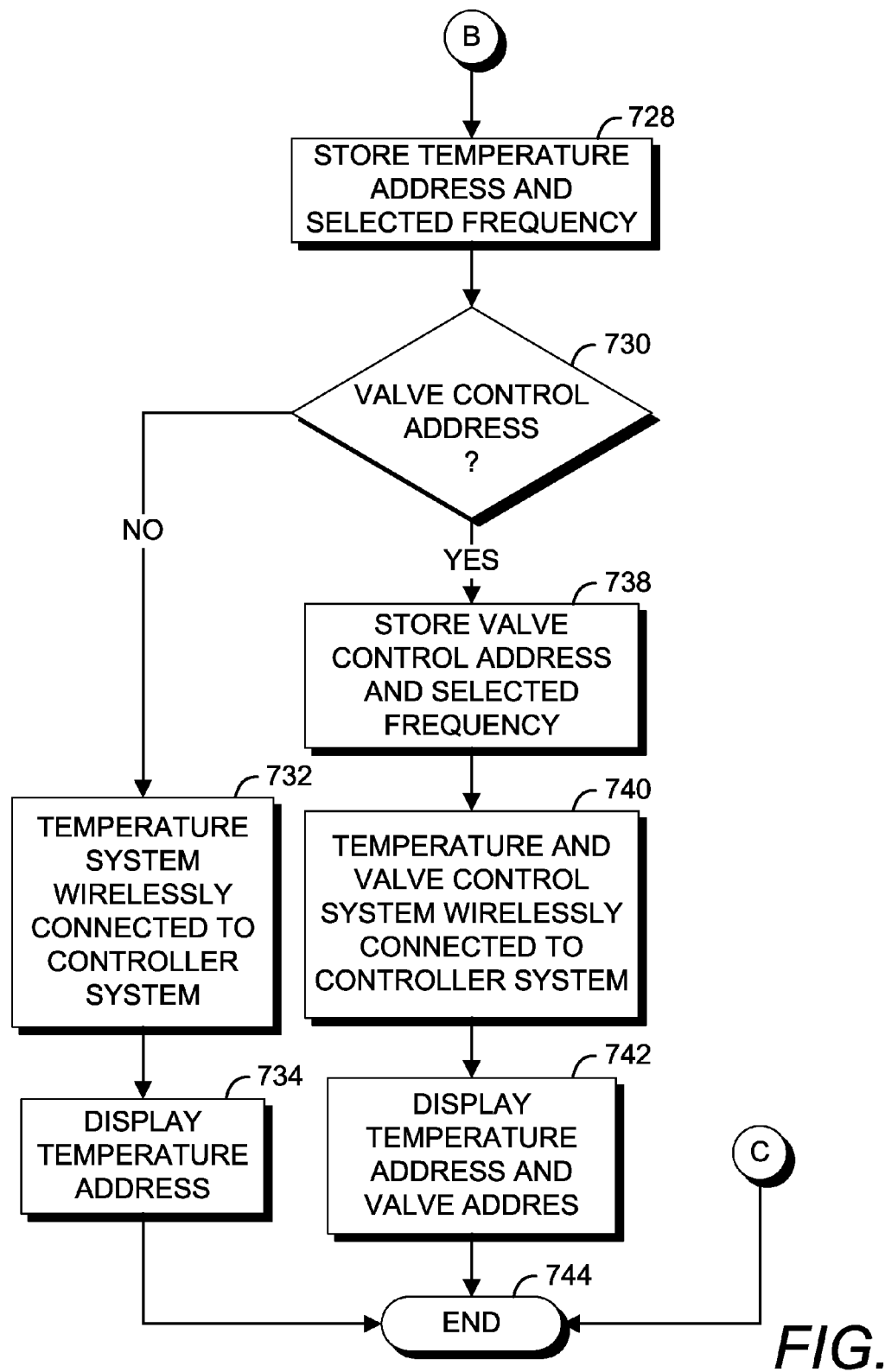
FIG. 12 is a flowchart of another aspect of the temperature monitoring and control method.

FIGS. 10-12 show a method of wirelessly linking a controller system 102 to a powered temperature system 302. From a start 702 the controller system 102 is powered and initialized at 704. A sync switch 116 on the controller system 102 is moved from a first position to a second position at 706 initiating the link process including scanning for a radio frequency signal transmitted by a temperature system 302 or a valve control system 202 at 708. During the scanning process a visual indication appears on the display 160 at 710, and the controller system 102 scans the available radio frequencies reserved for forming linking associations, with valve control systems 202 and temperature systems 302. In an embodiment, the visual indication at 710 is the text "LINKING." If an interfering controller system transmitting a radio frequency is detected during the linking process at decision box 712, the link and scanning process is stopped at 714, and a visual indication appears on the display 160 at 716. In an embodiment, the visual indication at 716 is the text "LINK FAILED." If a link failed due to an interfering controller system, the process can begin again from the start 702 after the interfering controller system has completed its link process or has failed to link thereby stopping its scanning activity. If an interfering controller system does not interrupt the present linking process, the controller system 102 continues to scan for temperature system address signals transmitted from a temperature system 302 and/or valve control system address signals transmitted from a valve control system 202.

If the controller system 102 detects a temperature system address data signal transmitted from a temperature system 302 at decision box 718, the controller system 102 selects a unique radio frequency at random and determines if the selected radio frequency is available at decision box 720. If the selected radio frequency is not available, the linking and scanning process is stopped at 722, and a visual indication appears on the display 160 at 724. In an embodiment, the visual indication at 724 is the text "LINK FAILED." If a link failed due to a busy selected radio frequency, the sync switch 116 on the controller system 102 is moved from a first position to a second position at 726 reinitiating the selection of a unique radio frequency at random. If a radio frequency is available, a first wireless data signal link is established between the controller system 102 and the temperature system 302, and the controller system 102 stores the temperature system address data in memory 254, along with the associated selected radio frequency at 728. If the temperature system 302 only transmits temperature system address data at decision box 730, the temperature system 302 is wirelessly connected to the controller system 102 at 732. The temperature system address data information is presented on the display 160 at 734 indicating the temperature system 302 is wirelessly connected to the controller system 102 with the linking operation ending at 744. If a temperature system 302 will remain linked with a controller system 102, the linking process between the two devices will only need to be performed once because the associated address data will be stored in the memory of the respective devices.

In an alternative embodiment, a particular temperature system 302 may be used only with a particular valve control system 202 such as when both devices are mounted to the same tank 558. As such, the particular temperature system address data transmitted by the temperature system 302 also includes a particular valve control system address data. If the temperature system 302 transmits both temperature system address data and valve control system address data, both the temperature system address data and the valve control system address data are stored in memory 254, along with the associated selected radio frequency and channel at 738. The temperature system 302 and valve control system 202 are wirelessly connected to the controller system 102 at 740. The temperature system address and the valve control system address information are presented on the display 160 at 742 indicating the temperature system 302 and the valve control system 202 are wirelessly connected to the controller system 102 with the linking operation ending at 744.

In an alternative embodiment, when the temperature system 302 does not provide an associated valve control system address data, the controller system 102 establishes a second wireless data signal link with a powered valve control system 202. If the controller system 102 detects a valve control system address signal transmitted from a valve control system 202 at decision box 752, the controller system 102 selects a unique radio frequency at random and determines if the selected radio frequency is available at decision box 754. If the selected radio frequency is not available the linking and scanning process is stopped at decision box 756, and a visual indication appears on the display 160 at 758. In an embodiment, the visual indication at 758 is the text "LINK FAILED." If a link failed due to a busy selected radio frequency, the sync switch 116 on the controller system 102 is moved from a first position to a second position at 760 reinitiating the selection of a unique radio frequency at random. If a selected radio frequency is available, a second wireless data signal link is established between the valve control system 202 and the valve control system 202 by the controller system 102 storing the valve control system address in memory 154, along with the associated selected radio frequency and channel at 762. The valve control system 202 is wirelessly connected to the controller system 102 at 764. The valve control system address is presented on the display 160 at 766 indicating the valve control system 202 is wirelessly connected to the controller system 102 with the linking operation ending at 744.

Linking of the controller system 102 to a device may be aborted during the linking process by terminating the supply of electricity to the device, such as by disconnecting the power source 158.

Figure 9:
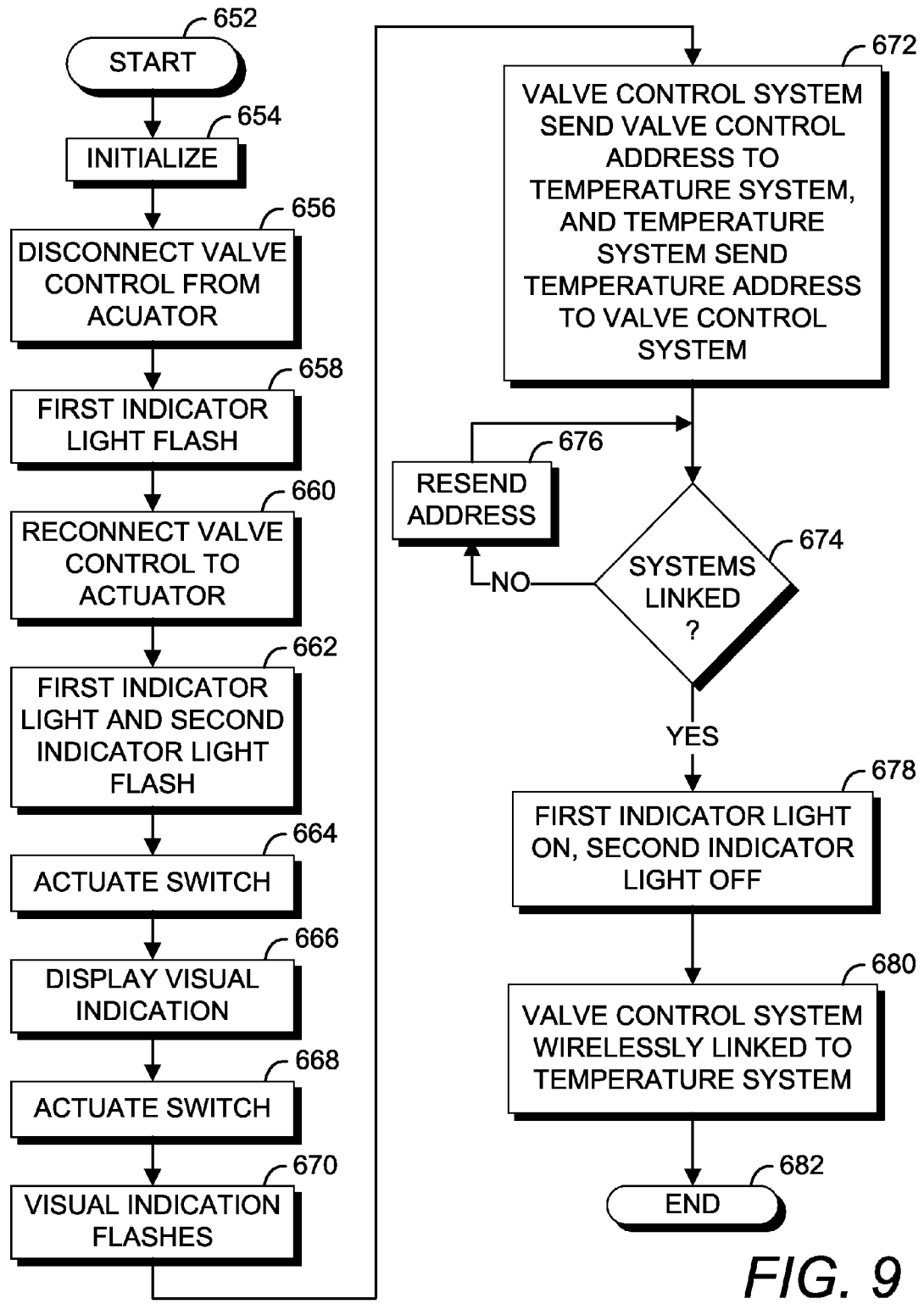
FIG. 9 is a flowchart of another aspect of the temperature monitoring and control method.

FIG. 9 shows a method of wirelessly linking a valve control system 202 to a powered temperature system 302. From a start 652 the valve control system 202 is powered and initialized at 654 while the valve control system 202 connected to the actuator 260. The first indicator light 262 is illuminated when the valve control system 202 is powered. In an embodiment, the first indicator light 262 is red in color. The valve control system 202 is disconnected from the actuator 260 at 656 until the first indicator light 262 flashes at 658. The valve control system 202 is reconnected to the actuator 260 at 660 until the first indicator light 262 and the second indicator light 264 flash in alternation at 662. In an embodiment, the second indicator light 264 is green in color. The switch 366 on the temperature system 302 is moved from a first position to a second position at 664 until a visual indication appears on the display 360 at 666. In an embodiment, the visual indication is the text "L." When the visual indication appears the switch 366 is moved from the second position to the first position at 668. The visual indication flashes at 670 indicating the valve control system 202 is linking with the temperature system 302. The valve control system 202 transmits a valve control system address data stored in memory 254 wirelessly over a radio frequency to the temperature system 302, and the temperature system 302 transmits the temperature system address data stored in memory 354 wirelessly over a radio frequency to the valve control system 202 at 672. The valve control system address is a unique device address including the device type and serial number. If the valve control system address is not received by the temperature system 202 and/or the temperature system address is not received by the valve control system 202, or, alternatively from decision box 674, the valve control system address is resent to the temperature system 202 and/or the temperature system address is resent to the valve control system 202 at 676. When the valve control system address is received by the temperature system 302, and the temperature system address is received by the valve control system 202, the first indicator light 262 will remain on, and the second indicator light 264 will turn off at 678 indicating the temperature system address is stored in memory 254 and the valve control system address is stored in memory 354, wirelessly linking the temperature system 302 with the valve control system 202 at 678. The linking operation ends at 680. Thereafter, the power to the valve control system 202 may be disconnected or connected, such as by the coupling and uncoupling of the tractor 502 power supply from the trailer 552 power supply, and the devices will reconnect when power is restored because the valve control system 202 and the temperature system 302 are linked by the temperature system address stored in memory 254 and the valve control system address stored in memory 354. The first indicator light 262 flashes if there is an error with the valve control system 202.

Some embodiments of the above-described systems and methods are implemented as software processes that are specified as a set of instructions recorded on the computer readable medium. When the instructions are executed by the one or more computational element(s), the instructions cause the computational element(s) to perform the actions indicated by the instructions.

The term "computer" means a device or system with at least one microprocessor. Examples of computers include laptop computers, tablet computers, mobile phones, digital media players, game consoles, digital wristwatches, head-mounted display systems, digital televisions, set-top boxes and file servers. The computer may include touch screen functionality or gesture control functionality for the input of commands. The term "device" is meant to be interchangeable with the term computer where it is clear from the context that the reference is to a computer as defined herein (i.e. with at least one microprocessor).

The terms "computer readable medium" and "computer readable media" can be used interchangeably to mean storage that can be accessed by a computer. These terms include non-volatile memory such as a dynamic storage device, random-access memory (RAM), read-only memory (ROM), flash memory, a hard drive, database, or any other suitable non-transitory computer-readable media, such as optical, magnetic, or solid-state computer readable media, as well as a combination thereof, provided that neither term is intended to include any propagated signal, any carrier wave or any other non-statutory subject matter.

In use, the controller system 102 is used to monitor and control the temperature of the heated contents within the tank 558. Referring again to FIGS. 1-6 an embodiment of the temperature monitoring and control system 100 in an exemplary temperature monitoring and control environment is shown whereby the controller system 102, valve control system 202, and temperature system 302 are wirelessly linked. During operation, the controller system 102 displays the current activity and settings of the system 100 on the display 160, including the high temperature limit, low temperature limit, and the current temperature value of the contents of the inner chamber 570. The speaker provides audible alarms to the operator, described more fully below. A data logger connected to the processor 152 records data in memory 154 creating a database, including time, time zone, date, temperature system address, temperature data received from the temperature system 302, high temperature limit data, low temperature limit data, valve control system address, valve position data, alarm condition data, and alarm silence data. Data stored by the data logger can be output from the controller system 102 in a report format via a communication connection 166 or wireless output via the RF transceiver 156. In order for the system 100 to monitor and control the temperature of the heated contents, an operator inputs and stores various commands into the controller 102 memory 154 including the desired temperature range at which the contents are to be maintained.

In normal operation, the display 160 shows the information described above. A first actuation of the limits 108 switch presents a display contrast interface. Auction of the up 112 switch increases the display 160 contrast by one step. Actuation of the down 114 switch decreases the display 160 contrast by one step.

A second actuation of the limits 108 switch presents a high temperature limit data or value interface, and a character is displayed by the display 160. In an embodiment, the character displayed is a greater-than symbol (>). An operator inputs the high temperature limit data or value into memory 154 by actuating the up 112 switch to scroll through the temperature values stored in memory 154 and increase the temperature value displayed by the display 160, or by actuating the down 114 switch to scroll through the temperature values stored in memory 154 and decrease the temperature value displayed by the display 160. Each actuation of the up 112 and down 114 switch advances the value one increment. Actuating the up 112 switch from a first position to a second position, and retaining the up 112 switch in the second position for a period of time, for example, for about at least one second, the value displayed increases three increments every second while the up 112 switch is in the second position. Moving the up 112 switch back to the first position ceases advancement of the value displayed. Actuating the down 114 switch from a first position to a second position, and retaining the down 114 switch in the second position for a period of time, for example, for about at least one second, the value displayed decreases three increments every second while the down 114 switch is in the second position. Moving the down 114 switch back to the first position ceases advancement of the value displayed. The value shown on the display is selected and stored in memory 154 if no actuation of a switch occurs for a period of time, for example, for about at least two seconds.

A third actuation of the limits 108 switch presents a low temperature limit data or valve interface, and a character is displayed by the display 160. In an embodiment, the character displayed is a greater-than symbol (>). The operator inputs low temperature limit data or values into memory 154 by actuating the up 112 switch and down 114 switch as above.

If no adjustment of a temperature value is made for a period of time, for example thirty seconds, the controller system 102 will return to the display contrast interface. Once the high temperature limit data and low temperature limit data are stored in the controller system 102 the controller system 102 monitors the temperature of the contents of the tank 558 via the temperature system 302, and heat is applied to the contents, or heat is not applied, in order to keep the contents within the high and low temperature values. In use, an audible alarm sounds from the controller system 102 speaker if a current temperature value received from the temperature system 302 is greater than the stored high temperature limit, or less than the stored low temperature limit.

A fourth actuation of the limits 108 switch returns the controller system 102 to the display contrast interface.

Actuation of the pre-heat 110 switch presents a pre-heat interface, allowing an operator to input and store pre-heat temperature commands into memory 154. Pre-heating may be performed at a first facility or a second facility via an external heat source, such as a stand-alone heat source, while the trailer 552 is parked. Although the aforementioned feature is described as pre-heating, the pre-heating feature allows an operator to heat and hold the temperature of the contents of the tank 558 prior to connecting the trailer 552 to a vehicle and moving the contents between facilities, and allows an operator to heat and hold the temperature of the contents of the tank 558 after the contents have been delivered to the facility. A first actuation of the pre-heat 110 switch presents an ON and OFF interface for toggling the pre-heat function between an ON condition and an OFF condition. The default condition of the pre-heat function is OFF. Each actuation of the up 112 switch, or each actuation of the down 114 switch, toggles the pre-heat function between the ON condition and the OFF condition, and the associated condition is graphically represented on the display 160 by the text "ON" or "OFF." An operator inputs a pre-heat temperature into memory 154 using the up 112 switch and down switch 114 in the manner described above for selecting high and low temperature limits. When the pre-heat function is in the ON condition, the valve 408 will be actuated to an open position, and the contents of the tank 558 will receive heat from the heat transfer system 506 until the temperature of the contents of the container 558, as measured by the temperature system 302, equals the pre-heat temperature value stored in memory 154. When the pre-heat temperature value is achieved a visual indication appears on the display 160, an audible portion of an alarm will sound from the controller system 102, and the valve 408 will be actuated to a closed position and the contents of the tank 558 will not receive heat from the heat transfer system 506. In and embodiment, the visual indication is the text "END." If the temperature system 302 detects the temperature of the contents has fallen below the pre-heat temperature value, heating of the contents will resume, and the alarm will continue to sound. If the temperature system 302 detects the current temperature of the contents is above the pre-heat temperature value, the heating will cease and a visual indication appears on the display 160. In and embodiment, the visual indication is the text "END." Selecting the OFF condition ceases the pre-heating process.

Actuation of the snooze 118 switch silences the audible portion of an active alarm. A first actuation of the snooze 118 switch creates a temporary silence condition that silences the audible portion of a current alarm for a first period of time, for example, for thirty one minutes. A second actuation of the snooze 118 switch during the first period of time silences the audible portion of an alarm for a second period of time, for example, for thirty one minutes, with the second period of time beginning upon the second actuation of the snooze 118 switch. Actuating the snooze 118 switch from a first position to a second position, and retaining the snooze 118 switch in the second position for a period of time, for example, for about at least ten seconds, during an audible portion of an alarm, or during the first or a second period of time, creates an indefinite silence condition that silences the audible portion of an alarm. Actuating the snooze 118 switch during the silence condition will cancel the silence condition and immediately sound the audible portion of an active alarm. In use, an audible alarm sounds from the controller system 102 if a current temperature value is greater than the stored high temperature limit, or less than the stored low temperature limit. If a subsequent temperature value is less than the stored high temperature limit, or greater than the stored low temperature limit, the audible alarm will not sound, and such a change in an alarm condition from exceeding temperature limits to within temperature limits will cancel a temporary or indefinite silence condition. If the wireless communication between the temperature system 302 and the controller system 102 is lost during a temporary or indefinite silence condition, an alarm condition will occur and the temporary or indefinite silence condition will be canceled.

Actuating the snooze 118 switch and the down 114 switch at the same time executes a command to transfer the data stored in the data log to an external device either wirelessly, or to a device connected by a wire to the communications connection 166.

The controller system 102 can display various visual indications or messages on the display 160. Messages include: the text "ID X" where "X" represents the serial number of the last temperature system 302 linked with the controller system 102; the text "LINK LOST"; the text "LINKING"; the text "LOW BATTERY"; the text "LINK FAILED"; and the text "VALVE LOST." The text "LOST LINK" indicates the controller system 102 and the temperature system 302 have not communicated for a period of time, for example, for at least forty five minutes, or the controller system 102 has just been powered on. "A LOST LINK" is an alarm condition causing an audible alarm from the controller system 102. The "LOST LINK" condition may be caused by the lack of a wireless signal between the temperature system 302 or the obstruction of the wireless signal from the temperature system 302 to the controller system 102. The "LOST LINK" condition can be cleared, and the audible alarm canceled, by actuating switch 366 on the temperature system 302. The text "LINKING" indicates the controller system 102 is scanning for a temperature system 302 or a valve control system 202. The text "LOW BATTERY" indicates the electrochemical cell requires replacement. The text "LINK FAILED" indicates an interfering controller system is within range of the RF transceiver 156 of the controller system 102, and the interfering controller system is in the process of linking with devices, or is already using the radio frequency and channel selected by the controller system 102. If a "LINK FAILED" condition is received, the operator should wait for a period of time, for example, about ten seconds, and actuate the sync 116 switch again. The text "VALVE LOST" indicates the wireless communication between the valve control system 202 associated with the valve control system address and the controller system 102 has not occurred for a period of time, for example, for at least about two minutes, and the wireless connection between the devices has been lost.

Actuation of the switch 366 on the temperature system 302 displays the current temperature value detected by the temperature sensor on the display 360, and transmits the current temperature data including a current temperature value to the controller system 102, described in more detail below. Actuation of the switch 366 also initiates the linking process, discussed above. If the switch 366 is actuated from a first position to a second position, and held at the second position for a period of time, for example, from about one tenth of a second to about two seconds, followed by a return of the switch 366 to the first position, the temperature sensor 362 measures the current temperature and generates temperature data including a temperature value. In an embodiment, the temperature value is represented by the Fahrenheit temperature scale. In an alternative embodiment, the temperature value is represented by the Celsius temperature scale. The temperature value is displayed on the display 360, and the temperature data is transmitted to and received by the linked controller system 102. Initiating an immediate display of the current temperature value and transmission of the current temperature data to the controller system 102 may be used to reestablish the wireless connection between the temperature system 302 and the controller system 102 instead of waiting for the temperature system 302 to cycle through another sleep timeframe.

If the switch 366 is actuated from a first position to a second position, and held at the second position for a period of time, for example, from about two seconds to about five seconds, and until a visual indication appears on the display 360, followed by a return of the switch 366 to the first position, the linking process is initialized. In an embodiment, the visual indication is the text "L."

If the switch 366 is actuated from a first position to a second position, and held at the second position for a period of time, for example, for at least about five seconds, followed by a return of the switch 366 to the first position, the temperature system 302 powers off and begins a sleep condition for a specified period of time, for example, for about fifteen minutes.

Next discussed will be the operation of the system 100 as it monitors and controls the temperature of the contents of a container. On a periodic timeframe, for example, every fifteen minutes, the temperature system 302 wakes from sleep or initializes, measures the amount of energy of the power source 258 generating power source data, measures the current temperature value of the contents of the inner chamber 570 generating current temperature data including the current temperature value, and transmits the data along with the temperature system address and valve control system address to the controller system 102 associated with the controller system address stored in memory 354. The controller system 102 receives the aforementioned information and stores the information in memory 154. Upon receipt of the information from the temperature system 302, the controller system 102 transmits an acknowledgement signal to the temperature system 302 acknowledging receipt of the information, and signaling the temperature system 302 to power off and begin the sleep condition for another timeframe. The amount of time the temperature system 302 and controller system 102 spend exchanging information is less than the amount of time the temperature system 302 spends in sleep allowing a power source 358 having a stored charge to provide power to the system 302 over a long period of time. If the controller system 102 does not transmit an acknowledgement signal to the temperature system 302 acknowledging receipt of the information from the temperature system 302, the temperature system 302 will enter a retransmission cycle whereby the information is retransmitted to the controller system 102 a number of times during a period of time, for example, up to about seventy-five times over at least five seconds. If the controller system 102 has not transmitted an acknowledgement signal to the temperature system 302 acknowledging receipt of the information during the retransmission cycle, the temperature system 302 returns to a sleep condition and cycles through another sleep timeframe. If the controller system 102 does not transmit a signal to the temperature system 302 acknowledging receipt of the information from the temperature system 302 after repeated transmission attempts over a timeframe, for example, for at least eight hours, the temperature system 302 will increase the sleep condition timeframe from fifteen minutes to one hour in order to conserve the energy of the power source 358. Once the controller system 102 transmits an acknowledgement signal to the temperature system 302 the system 302 will return to the default cycle time.

The valve control system 202 scans for information broadcast from the linked controller system 102 and temperature system 302 within its radio range. The valve control system 202 requests the current temperature data, including the current temperature value representing the temperature of the contents of the container, high temperature limit data, and low temperature limit data from the controller system 102 at a periodic timeframe, for example, every twenty seconds. If the valve control system 202 fails to receive the current information within a specific timeframe, for example, after requesting the information for five seconds, the valve control system 202 returns to a scanning condition scanning for information from a linked controller system 102.

The controller system 102 analyzes the received information. If the current information indicates the current temperature value received from the temperature system 302 is above the high temperature valve or below the low temperature value programmed into the controller system 102, the system 102 generates an audible alarm, and generates a visual alarm via the display 160. The controller system 102 transmits the current temperature data, high temperature limit data, and low temperature limit data to the valve control system 202. The valve control system 202 receives the data and stores the data in memory 254.

In order to keep the contents within a specified temperature range, the controller system 102 can be programmed to add heat or not add heat when the temperature of the contents of the tank 558 fall within a range of temperature values near the limit values. The valve control system 202 analyzes the received information. When the programmed difference between the high temperature limit value and low temperature limit value is greater than or equal to fifteen units: the valve control system 202 causes the actuator 260 to open the valve 408 and permit movement of heat retaining fluid into the conduit 574 when the current temperature value is between about equivalent to the low temperature value and about equal to five units greater than the low temperature value, and when the current temperature value is less than the low temperature value; and the valve control system 202 causes the actuator 260 to close the valve 408 and prohibit movement of heat retaining fluid into the conduit 574 when the current temperature value is between about equivalent to the high temperature value and about equal to five units less than the high temperature value, and when the current temperature value is greater than the high temperature value.

When the programmed difference between the low temperature limit value, represented by A, and the high temperature limit value, represented by D, is less than fifteen degrees, the unit difference between A and D is divided into about three equal range units; a lower range from A to B, a middle range from B to C, and an upper range from C to D. For example: B is a value that is one range unit value greater than A, and my be represented by the formula B=A+(1/3 (D−A)); and C is a value that is one range unit value less than D, and may be represented by the formula C=D−(1/3 (D−A)). In such a scenario: the valve control system 202 transmits a position command to the actuator 260 to open the valve 408 and permit movement of heat retaining fluid into the conduit 574 when the current temperature value is between about equivalent to value A and about equal to value B, and when the current temperature value is less than value A; and the valve control system 202 causes the actuator 260 to close the valve 408 and prohibit movement of heat retaining fluid into the conduit 574 when the current temperature value is between about equivalent to value D and about equal to value C, and when the current temperature value is greater than value D.

When the actuator 260 positions the valve 408 in the open position, the second indicator light is illuminated. When the actuator 260 positions the valve 408 in the closed position, the second indicator light is not illuminated. In some embodiments, the valve 408 is positioned in an intermediate position at a point between about the open position and the closed position to allow a controlled constant movement of heat retaining fluid into the conduit 574. In some embodiments, the intermediate position is continuously adjusted to maintain the current temperature value.

In an embodiment, the temperature monitoring and control system 100 includes only a controller system 102 and a temperature system 302 for monitoring the temperature of the contents of a container. In an embodiment, a switch on the controller system 102 can be actuated to remove the connection between the controller system 102 and the valve control system 202. The temperature system 302 is utilized to periodically measure the temperature of the contents of the container and the controller system 102 allows an operator to monitor the temperature as the controller system 102 records the data for later output and review.

The controller system 102 can be a mobile device integrated into other process control monitoring devices or software at a first or second facility allowing the data generated by the temperature system 302 and the valve control system 202, and control of the valve control system 202, to be monitored, recorded, and controlled by additional software, systems, or devices. The temperature monitoring and control system 100 may also integrate satellite and cellular communications throughout allowing the monitoring and control of the temperature of the contents of the container from a distant location, and the ability to alert a third party if an issue arises with the system 100 or components of the system 100. For example, the system 100 can communicate with a computing device wirelessly, such as a computer or smartphone, through the Internet or Internet based software application, alerting the operator or third part as to the condition of the system 100. Remote monitoring of the system 100 allows enhanced monitoring and control of the system 100 and provides alerts as to malfunction, damage, or theft of the system 100 or its components.

It will be appreciated that the components of the temperature monitoring and control system 100 can be used for various other applications. Moreover, the system 100 can be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology is used in the description for convenience in reference only and will not be limiting. For example, up, down, front, back, right and left refer to the disclosed subject matter as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

Having thus described the disclosed subject matter, what is claimed as new and desired to be secured by Letters Patent is:

1. A computer-implemented method of controlling the temperature of the contents of a container with a heat source, the method comprising the steps of:
    providing a temperature system;
    providing a processor on the temperature system;
    providing a temperature sensor connected to the processor on the temperature system;
    with the temperature sensor, detecting a first current temperature of the contents of the container;
    providing the first current temperature as input to the temperature system processor;
    computing temperature data for the container with the temperature system processor;
    with the temperature system, transmitting the temperature data as a temperature signal;
    providing a controller system;
    providing a processor on the controller system;
    preprogramming a high temperature value and a low temperature value and storing the high and low temperature values as input to the controller system processor;
    receiving temperature signals with the controller system;
    computing valve control data based on the high and low temperature values and temperature data with the controller system processor;
    with the controller system, transmitting the valve control data as a valve control signal;
    providing a valve control system;
    providing a processor on the valve control system;
    receiving the valve control signal with the valve control system;
    providing the heat source with an inlet valve for controlling the heat added to the contents of the container; and
    controlling the inlet valve using the valve control signal.

2. The method of claim 1, which includes the additional steps of:
    providing an actuator connected to the valve control system processor and the inlet valve;
    using the valve control system processor to calculate an inlet valve position data based on the valve control data; and
    controlling the inlet valve position using the inlet valve position data.

3. The method of claim 1, which includes the additional steps of:
    using the valve control system processor to calculate an inlet valve position data based on the valve control data;
    opening the inlet valve when the first current temperature is between the low temperature value and five units greater than the low temperature value; and
    opening the inlet valve when the first current temperature is less than the low temperature value.

4. The method of claim 1, which includes the additional steps of:
    using the valve control system processor to calculate an inlet valve position data based on the valve control data;
    closing the inlet valve when the first current temperature is between the high temperature value and five units greater than the high temperature value; and
    closing the inlet valve when the first current temperature is greater than the high temperature value.

5. The method of claim 1, which includes the additional steps of:
    using the valve control system processor to calculate an inlet valve position data based on the valve control data;
    wherein the low temperature limit value is A, and the high temperature limit value is D, temperature B is determined by the formula $B=A+(1/3(D-A))$;
    opening the inlet valve when the first current temperature is between A and B; and
    opening the inlet valve when the first current temperature is less than A.

6. The method of claim 1, which includes the additional steps of:
    using the valve control system processor to calculate an inlet valve position data based on the valve control data;
    wherein the low temperature limit value is A, and the high temperature limit value is D, temperature C is determined by the formula $C=D-(1/3(D-A))$;
    closing the inlet valve when the first current temperature is between D and C; and
    closing the inlet valve when the first current temperature is greater than D.

7. The method of claim 1, which includes the additional step of creating with the controller system processor a database comprising a first time, a date, the temperature system address, the first current temperature, the high temperature limit data, the low temperature limit data, the valve control system address, the valve position data, alarm condition data, and alarm silence data.

8. The method of claim 7, which includes the additional step of updating the database to reflect a second current temperature.

9. A system for monitoring and controlling the temperature of the contents of a container, with the contents heated by a heat source connected to the container by a valve, the system comprising:
- a temperature system, comprising:
  - a temperature sensor generating a current temperature value of the contents of the container;
  - a processor connected to the temperature sensor and a transceiver; and
  - wherein the transceiver wirelessly transmits the current temperature value as a temperature signal;
- a controller system, comprising:
  - a processor connected to a transceiver;
  - wherein the controller system transceiver wirelessly receives the temperature signal;
  - an input device for inputting a high temperature limit value A command and a low temperature value limit value D command into the processor;
- using the controller system processor to calculate temperature B and temperature C, wherein temperature B is determined by the formula B=A+(1/3(D−A)), and temperature C is determined by the formula C=D−(1/3(D−A); and
- wherein the controller system transceiver wirelessly transmits a valve control signal;
- a valve control system, comprising:
  - a processor connected to a transceiver;
  - wherein the transceiver wirelessly receives the valve control signal; and
  - an actuator operably connected to the valve control system processor and the valve for positioning the valve in response to the valve control signal, wherein the valve position is open when the valve control signal is a valve open position command, and wherein the valve position is closed when the valve control signal is a valve closed position command;
- wherein when the current temperature value is between A and B the valve control signal is a valve open position command;
- wherein when the first current temperature is less than A the valve control signal is a valve open position command;
- wherein valve when the current temperature value is between D and C the valve control signal is a valve closed position command;
- wherein valve when the current temperature value is greater than D the valve control signal is a valve closed position command.

10. The system of claim 9, wherein:
the temperature signal includes a temperature system address; and
the controller system stores the temperature system address.

11. The system of claim 9, wherein:
the valve control system transceiver wirelessly transmits a valve control system address as a valve control signal; and
the controller system stores the valve control system address.

* * * * *